United States Patent
Shao

(10) Patent No.: US 9,343,967 B2
(45) Date of Patent: May 17, 2016

(54) SINGLE INPUT MULTIPLE INPUT/OUTPUT SUPPLY FOR ENERGY HARVEST APPLICATION

(71) Applicant: Analog Devices, Inc., Norwood, MA (US)

(72) Inventor: Bin Shao, Shanghai (CN)

(73) Assignee: Analog Devices, Inc., Norwood, MA (US)

(*) Notice: Subject to any disclaimer, the term of this patent is extended or adjusted under 35 U.S.C. 154(b) by 93 days.

(21) Appl. No.: 14/182,913

(22) Filed: Feb. 18, 2014

(65) Prior Publication Data
US 2015/0214835 A1 Jul. 30, 2015

Related U.S. Application Data

(63) Continuation of application No. PCT/CN2014/071318, filed on Jan. 24, 2014.

(51) Int. Cl.
*H02M 3/158* (2006.01)
*H02J 7/34* (2006.01)
*H02J 7/35* (2006.01)
*H02M 1/00* (2006.01)

(52) U.S. Cl.
CPC ........... *H02M 3/158* (2013.01); *H02J 7/34* (2013.01); *H02J 7/35* (2013.01); *H02M 2001/0045* (2013.01)

(58) Field of Classification Search
CPC ....... H02M 3/158; H02M 3/1582; G05F 1/24; G05F 1/42; G05F 1/153; G05F 1/247
USPC ................... 323/247, 254, 257, 259
See application file for complete search history.

(56) References Cited

U.S. PATENT DOCUMENTS

| | | | | |
|---|---|---|---|---|
| 5,852,358 A * | 12/1998 | Ehsani | ...... | G05F 1/66 320/166 |
| 6,462,962 B1* | 10/2002 | Cuk | ...... | H02M 1/34 363/131 |
| 8,155,898 B2* | 4/2012 | Krein | ...... | H02M 1/15 702/182 |
| 8,378,633 B2* | 2/2013 | Bartling | ...... | H02M 1/15 320/128 |

OTHER PUBLICATIONS

Chen, Min, et al., "Single inductor, multiple input, multiple output (SIMIMO) power mixer-charger-supply system", 2007 ACM/IEEE International Symposium on Low Power Electronics and Design (ISLPED), (2007), 310-315.

* cited by examiner

*Primary Examiner* — Yemane Mehari
(74) *Attorney, Agent, or Firm* — Schwegman Lundberg & Woessner, P.A.

(57) ABSTRACT

An apparatus comprises a switching power circuit and a control circuit. The switching power converter circuit includes an output port for electrical coupling to a variable load, an input port for electrically coupling to a first energy source, wherein the energy density of the first energy source is insufficient to meet a peak energy requirement of the variable load, an input/output port for electrical coupling to a second energy source, and one inductor electrically coupled to the input port and a circuit node, wherein the electrical coupling is non-switchable. The control circuit is configured to charge the inductor using the first energy source via the input port, to provide energy from the inductor to the load via the output port, and to provide both of, via the input/output port, energy from the inductor to the second energy source and energy from the second energy source to the variable load.

20 Claims, 3 Drawing Sheets

SINGLE INPUT MULTIPLE INPUT/OUTPUT SUPPLY FOR ENERGY HARVEST APPLICATION

CLAIM OF PRIORITY

This application is a continuation under 35 U.S.C. §111(a) and claims benefit of priority to International Patent Application Serial No. PCT/CN2014/071318, filed on Jan. 24, 2014, which is hereby incorporated by reference herein in its entirety.

BACKGROUND

Energy harvesting can provide energy for electronic systems to make the electronic systems autonomous. The energy is obtained or harvested from renewable sources such as solar energy, wind energy, thermal energy, and kinetic energy. The energy provided by the energy source or sources can vary and may be interruptible. Electronic systems can include devices that require a regulated power source. Power converter circuits can be used to provide a regulated supply. Because of the desired autonomy of electronic systems, it can be important for the power converting process to be highly efficient. The present inventor has recognized a need for improved performance of power converter circuits.

OVERVIEW

This document relates generally to switching power converters and methods of their operation. An apparatus example includes a switching power circuit and a control circuit. The switching power converter circuit includes an output port for electrical coupling to a variable load, an input port for electrically coupling to a first energy source having an energy density insufficient to meet a peak energy requirement of the variable load, an input/output port for electrical coupling to a second energy source, and an inductor electrically coupled to the input port and a circuit node, wherein the electrical coupling is non-switchable. The control circuit is configured to charge the inductor using the first energy source via the input port, to provide energy from the inductor to the load via the output port, and to provide both of, via the input/output port, energy from the inductor to the second energy source and energy from the second energy source to the variable load.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Energy harvesting from renewable or autonomous sources can be used to power an autonomous or substantially autonomous electronic system. An example of an electronic system with advantages to being made autonomous is a wireless sensor network or WSN. A WSN includes distributed wireless nodes. The wireless nodes can include sensors to collect the data desired. For example, WSNs can be used to detect motion for security, to collect process data for industrial applications, and collect environmental data such as water quality data, air pollution data, etc. The wireless nodes can also include transceivers for wireless communication of data. The data can be communicated between nodes or to a master node in the network. The wireless nodes may receive data to configure the WSN. Another example of an electronic system with advantages to being made autonomous is a smart meter. A smart meter refers to a utility meter that can transmit its reading wirelessly to a receiving device.

Power circuits for such applications may need to provide a fixed or stable output voltage and get as much power from the energy source as possible. An approach to providing a regulated power source includes cascading a switching power supply with a regulating buck (or step down) converter, or with a low drop out (LDO) regulating stage. However, adding a regulating buck converter typically adds another inductor to the circuit which adds inefficiencies to the power conversion and can add to circuit area. Additionally, adding a separate LDO stage can degrade efficiency, such as when there is a large voltage gap between the source and the regulated supply.

Figure 1:
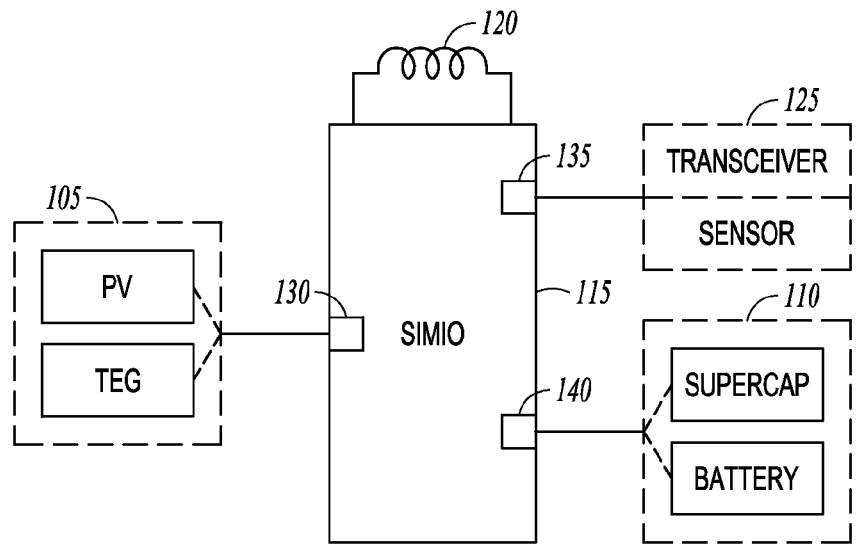
FIG. 1 shows a block diagram of an example of an energy harvest system.

FIG. 1 shows a block diagram of an example of an energy harvest system. The system includes first energy source 105, a second energy source 110 and an energy supply circuit 115. The first energy source may capture one or more of solar energy, wind energy, thermal energy, and kinetic energy. In certain variations, the first energy source 105 includes a low density energy source such as a photovoltaic cell array or a thermo-electric generator.

The second energy source 110 can be a rechargeable source such as a rechargeable battery or a supercapacitor. A supercapacitor, sometimes called an ultracapacitor, includes a different dielectric material than a conventional capacitor (e.g., a non-solid dielectric material). A supercapacitor can have an energy density much greater than the energy density of electrolytic capacitors (e.g., 10,000 times), but may only have a fraction of the energy density of a conventional battery (e.g., 10%). However, a supercapacitor can provide a faster charge/discharge cycle than a conventional battery and typically tolerate more charge/discharge cycles than a conventional battery. For these reasons, supercapacitors may be viewed as a hybrid between conventional capacitors and rechargeable batteries. Some examples of supercapacitors include double-layer capacitors, pseudo-capacitors, and hybrid capacitors.

The energy supply circuit 115 includes multiple ports. In the example in FIG. 1, the energy supply circuit 115 includes an input port 130 electrically coupled to the first energy source, an output port 135 electrically coupled to the electronic system, and an input/output port 150 electrically coupled to the second energy source. The energy supply circuit 115 includes a single inductor 120, and the energy supply circuit 115 can be considered a single inductor, multiple input/output (SIMIO) circuit.

The output port 145 can provide an energy source to an electronic system. In some variations, the energy provided by the energy harvest system makes the electronic system autonomous requiring no extra energy source. In some variations, the energy harvest system makes the electronic system substantially autonomous and some energy is provided to the electronic system by a separate energy source in addition to the energy harvest system.

The electronic system may impose variable load requirements on the energy harvest system. For instance, the example in FIG. 1 shows that the energy harvest system may be electrically coupled to a node of a wireless network. The wireless network node 125 can include a wireless transceiver to communicate with one or more other nodes of the network. In certain variations, the network is a WSN and the wireless network node 125 includes at least one sensor. The load on the energy harvest system may vary from when the wireless transceiver is in a standby mode and when the wireless transceiver is in an active mode and is performing one or both of transmitting and receiving. The first energy source has low energy density and is typically insufficient to meet the requirement of the peak energy consumption of the variable load requirement of the electronic system.

Figure 2:
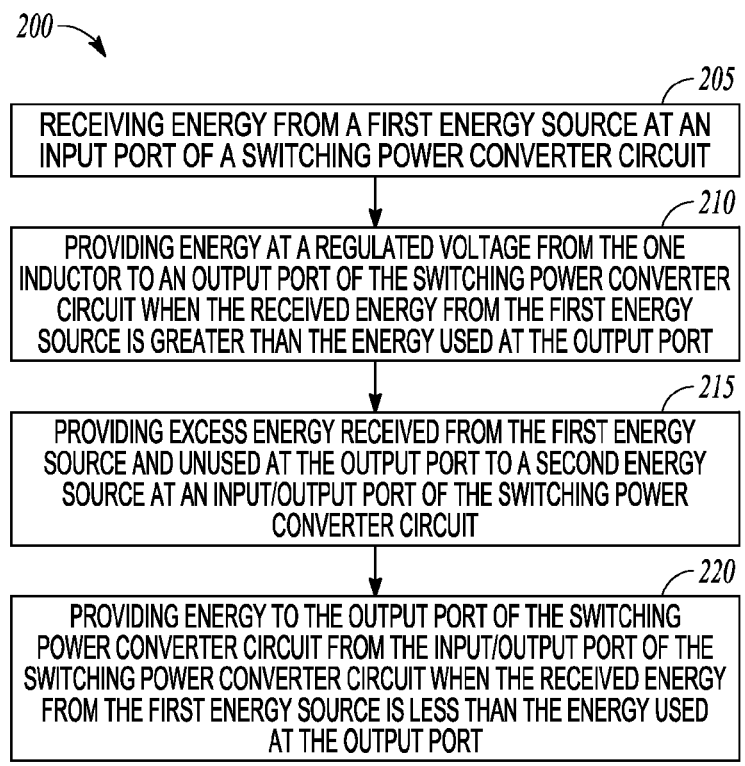
FIG. 2 shows a flow diagram of an example of a method of operating an energy harvest system.

FIG. 2 shows a diagram of an example of a method 200 of operating an energy harvest system. At 205, energy is received from a first energy source having a low-energy density. The energy can be received at an energy supply circuit of the energy harvest system. In some examples, the energy supply circuit can include a switching power converter circuit and the energy can be received at an input port of the switching power converter circuit. The switching power converter circuit may have only one inductor and may be an SIMIO switching power converter circuit. The energy harvest system is electrically coupled to an electronic system that has varying energy demands. As explained previously herein however, the low-energy density of the first energy source can be insufficient to meet all of the energy requirements (e.g. the peak requirement) of the variable load of the electronic system.

At 210, the switching power converter circuit provides energy from the inductor at a regulated voltage to the output port of the circuit when the energy received from the first energy source is greater than the energy used by the variable load. Any excess energy received from the first energy source and unused at the output port is provided at block 215 to a second energy source at an input/output port of the switching power converter circuit. The excess energy may be used to charge the second energy source.

At 220, when the received energy from the first energy source is less than the energy used by the variable load at the output port, energy is provided to the output port of the switching power converter circuit from the second energy source at the input/output port of the switching power converter circuit. In some variations, the extra energy required by the variable load is provided via the input/output port. In some variations, all of the energy required by the variable load is provided via the input/output port.

Figure 3:
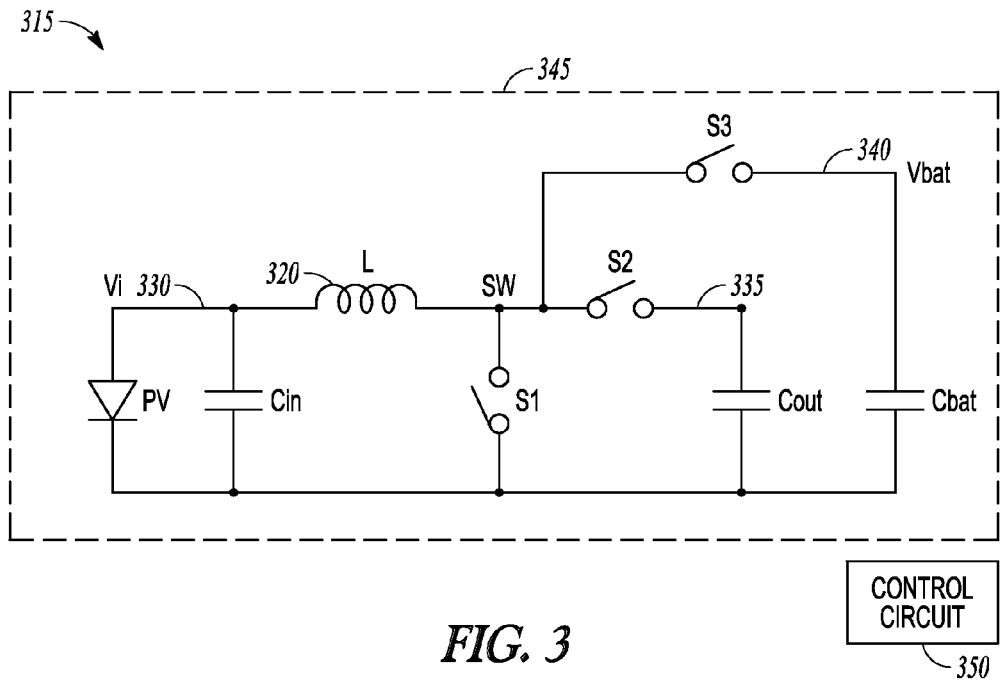
FIG. 3 illustrates portions of an example of an energy supply circuit for an energy harvest system.

FIG. 3 illustrates portions of an example of an energy supply circuit 315 for an energy harvest system. The energy supply circuit 315 includes a switching power converter circuit 345 and a control circuit 350. The switching power converter circuit 345 includes an output port 335 for electrical coupling to a variable load, an input port 330 for electrically coupling to a first energy source (e.g., a photovoltaic source or PV), and an input/output port 340 for electrical coupling to a second energy source (e.g., a battery or Vbat). The switching power converter circuit can include one or more filter caps Cin, Cout, and Cbat. The switching power converter circuit 345 also includes one inductor 320 that is electrically coupled to the input port 330 and a circuit node (labeled SW), and the circuit is an SIMIO circuit. The electrical coupling of the inductor 320 is non-switchable to the input port and the circuit node.

The energy supply circuit 315 also includes a control circuit 350. The control circuit 350 controls the configuration of the switching power converter circuit 345 to accomplish the charging and discharging of the inductor 320 such as by activating and deactivating the switch circuit of the switching power converter circuit 345. The control circuit 350 charges the inductor 320 using the first energy source via the input port 330, provides energy from the inductor 320 to the load via the output port 335, and provides both of, via the input/output port 340, energy from the inductor 320 to the second energy source and energy from the second energy source to the load.

The control circuit 350 may contain one or more timing circuits to control the switch circuits. In some variations, the control circuit 350 includes a processor such as a microprocessor that may implement at least a portion of the timing. The control circuit 350 and the switch circuits may be included on a single integrated (IC). In some variations, the filter capacitors are included on the IC.

The control circuit 350 may include one or more comparator circuits to adjust the duty ratios or duty cycles of the switch circuits through comparisons to one or more reference voltages to adjust one or both of an output current and an output voltage to a specified target. For instance, a comparator circuit may compare the output voltage to a target output voltage. When the output voltage is smaller than the target voltage, the inductor is charged or the duty ratio is increased to move the output toward the target. When the output voltage is greater than the target voltage the inductor is not charged or the duty ratio is decreased. In some examples, the one or more comparator circuits implement hysteresis in the switching. The output of a comparator circuit may transition to activate the charging when the input to the comparator is greater than a first threshold, and the output of a comparator circuit may transition to deactivate charging when the input is less than a second threshold that is different from the first threshold. In certain variations, the control circuit 350 may include an error amplifier to adjust one or both of an output current and an output voltage to a specified target. In certain variations, the switching power converter circuit 345 may be a pulse width modulated (PWM) power converter circuit and the control circuit 350 may control the duty ratios of the switch circuits to control charging and discharging of the inductor 320. However, a PWM switching regulator can consume a quiescent current that is too large for an energy harvest application having a low energy density harvest source. Thus, a PWM switching regulator may cause the energy harvest system to be too inefficient in light load conditions.

In the example shown in FIG. 3, the switching power converter circuit 345 includes a first switch circuit (S1) electrically coupled between the circuit node and a common voltage plane (e.g., a ground plane). The switching power converter circuit 345 can include a second switch circuit (S2) electrically coupled between the circuit node and the output port 335, and a third switch circuit (S3) electrically coupled between the circuit node and the input/output port 340. The control circuit 350 charges the inductor 320 from the first energy source using modulation of the first switch circuit, provides the energy from the inductor 320 to the load using modulation of the second switch circuit, and using the third switch circuit, provides the energy from the charged inductor to the second energy source and the energy from the second energy source to the load. It should be noted that the switching power converter circuit 345 of the example lacks any other electrical coupling between the output port 335 and the input/output port 340 other than the path through S3 and S2.

The load of the energy supply circuit can include a wireless transceiver (not shown) electrically coupled to the output port 335. In some variations, the wireless transceiver may be included in a wireless node of a network or can be included in a smart meter. In certain variations, a wireless sensor is electrically coupled to the wireless transceiver and the load includes the energy demand of the sensor. The wireless transceiver may operate in an active mode and a standby mode. Because the first energy source has a low energy density, the energy demand from the wireless transceiver in the active mode may exceed what the first energy source is able to provide, while the first energy source may be able to provide more energy than the energy demand in the standby mode. The control circuit 350 provides energy from the inductor 320 to the wireless transceiver and the input/output port 340 when the wireless transceiver is in the standby mode, and provide energy from the input/output port 340 to the when the wireless transceiver is in the active mode.

The control circuit 350 may operate the switching power converter circuit 345 in a boost mode circuit topology when the energy provided by the first energy source meets or exceeds the energy demand of the variable load. During the boost charge phase, the control circuit 350 closes or activates the S1 switch circuit to charge the inductor using the first energy source. During the boost discharge phase, the energy stored in the inductor is provided to the load by closing the S2 switch circuit and opening or deactivating the S1 switch circuit. If the energy provided by the first energy source exceeds the energy demand of the load, the extra energy can be used to charge the second energy source by closing the S3 circuit.

The control circuit 350 may operate the switching power converter circuit 345 as a buck-boost topology so that the voltage at the output port 335 can be either higher or lower than in voltage at the input port 330. In some examples, the control circuit 350 operates the switching power converter circuit 345 using multiple phases including a boost charge phase, a boost discharge phase, a buck charge phase, and a buck discharge phase. When the load uses less energy than the energy supplied by the first energy source, the control circuit 350 operates the switching power converter circuit as a boost converter circuit. The operation in the boost mode is explained previously herein.

When the load uses more energy than the energy supplied by the first energy source, the control circuit 350 operates the switching power converter circuit 345 as a buck converter circuit. During the buck charge phase, the control circuit 350 closes the S3 switch circuit and opens the S2 and S1 switch circuits to charge the inductor 320 and the input capacitor Cin using the second energy source. Thus, the charging of the inductor is bidirectional. During the buck discharge phase, the energy stored in the inductor 320 is provided to the capacitor Cin by closing the S1 switch circuit and opening the S3 switch circuit. Energy from the second energy source can be provided to the capacitor Cin by closing the S3 switch circuit.

Figure 4:
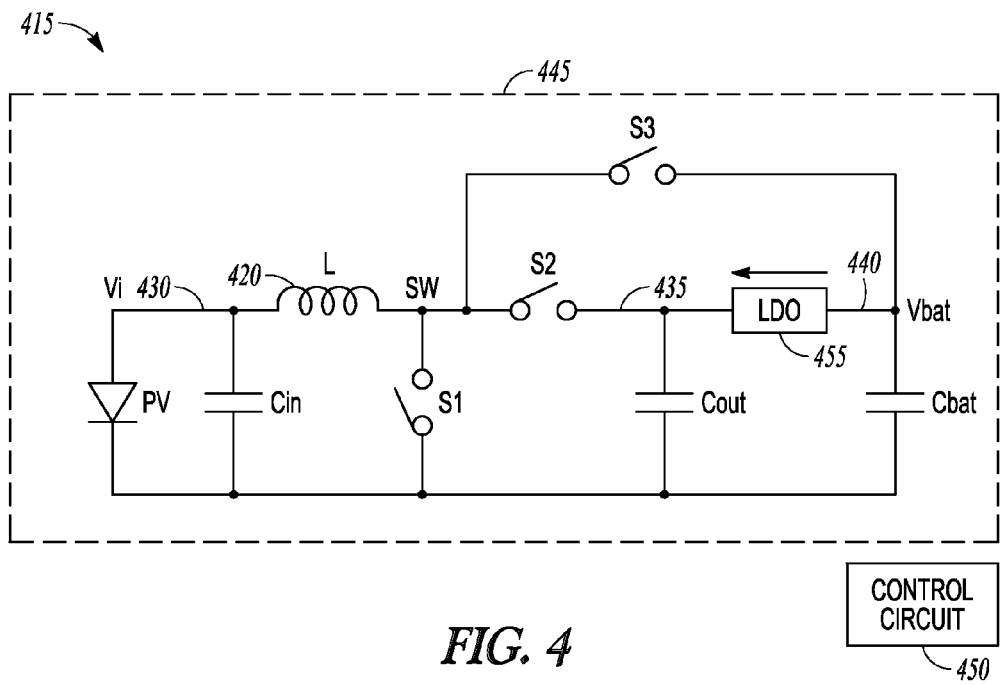
FIG. 4, FIG. 5, and FIG. 6 illustrate portions of further examples of an energy supply circuit for an energy harvest system.

FIG. 4 illustrates portions of another example of an energy supply circuit 415 for an energy harvest system. The energy supply circuit 415 includes a switching power converter circuit 445 and a control circuit 450. A difference between this example and the example in FIG. 3 is the low drop out (LDO) regulator electrically coupled between the input/output port 440 and the output port 435. The control circuit 450 operates the switching power converter circuit 445 as a boost converter. When the energy used by the variable load is less than the energy provided by the first energy source, the switching supply power converter circuit is operated as described above in regard to FIG. 3. When the energy used by the variable load is greater than the energy that is provided by the first energy source, energy is provided to the variable load (Vout) from the second energy source at the input/output port 440. The LDO regulator 455 provides energy at a regulated voltage from the second energy source at the input/output port 440 to the load at the output port 435. The LDO can provide improved control of the output such as by limiting the current provided to the output for example.

Figure 5:
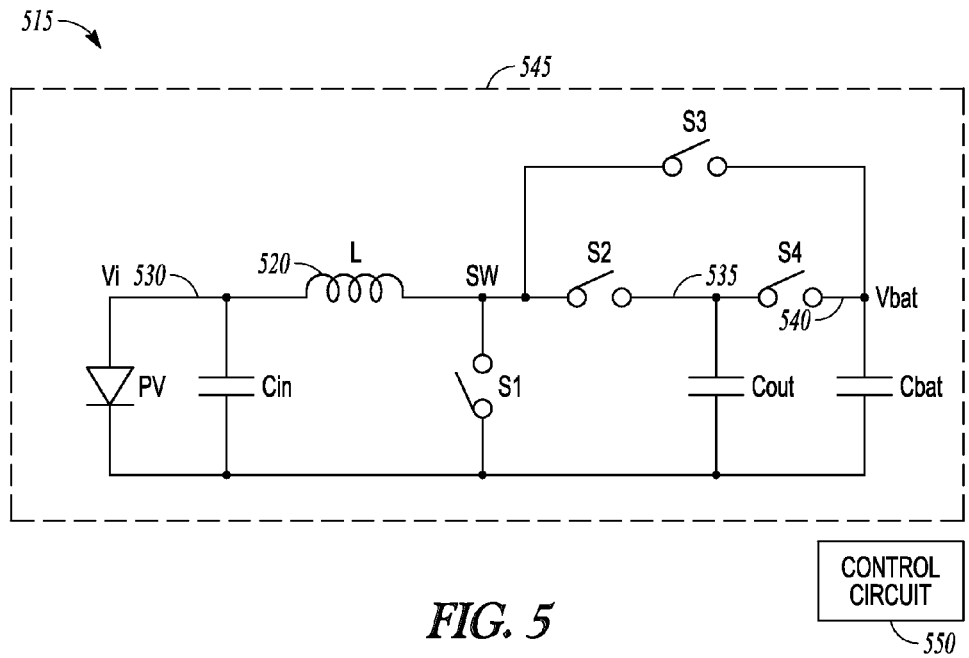

FIG. 5 illustrates portions of another example of an energy supply circuit 515 for an energy harvest system. The energy supply circuit 515 includes a switching power converter circuit 545 and a control circuit 550. A difference between this example and the example in FIG. 3 is a fourth switch circuit S4 electrically coupled between the input/output port 540 and the output port 535. As in the example of FIG. 4, the control circuit 550 operates the switching power converter circuit 545 as a boost converter. When the energy used by the variable load is greater than the energy that is provided by the first energy source, energy is provided to the variable load (Vout) from the second energy source at the input/output port 540. The control circuit operates the fourth switch circuit S4 to provide energy from the second energy source at the input/output port 540 to the load at the output port 535. In some variations, the fourth switch circuit S4 could be a load switch having a controllable on-resistance. The on-resistance can be adjusted by the voltage applied to the control input (e.g., a gate voltage) of the switch circuit, and the voltage can be adjusted depending on the current requirements from the second energy source to the variable load (Vout).

Figure 6:
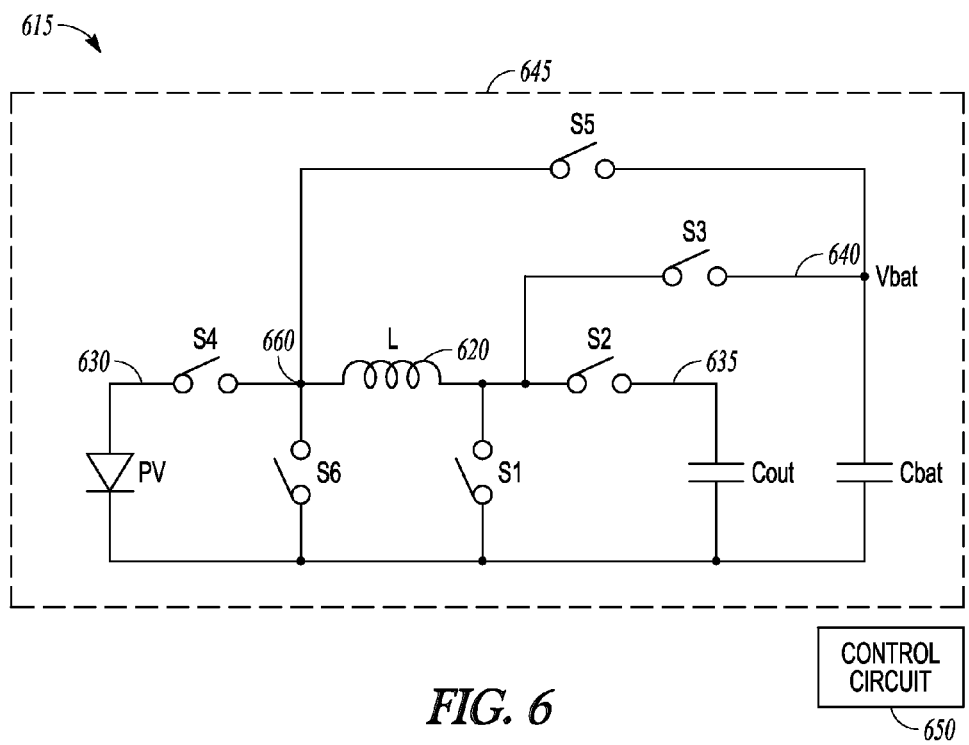

FIG. 6 illustrates portions of another example of an energy supply circuit 615 for an energy harvest system. The energy supply circuit 615 includes a switching power converter circuit 645 and a control circuit 650. In addition to the three switch circuits in FIG. 3, this example includes a fourth switch circuit (S4) electrically coupled between the first energy source at the input port 630 and a second circuit node 660, a fifth switch (S5) electrically coupled between the second energy source at the input/output node 640 and the second circuit node 660, and a sixth switch circuit (S6) electrically coupled between second circuit node 660 and the common voltage plane. The inductor 620 is electrically coupled between the second circuit node 660 and the first circuit node (SW).

The control circuit 650 operates the switching power converter circuit 645 as a buck-boost topology. When the variable load at the output port 635 uses less energy than the energy supplied by the first energy source at the input port 630, the control circuit 650 operates the switching power converter circuit 645 as a boost converter circuit. When the variable load uses more energy than the energy supplied by the first energy source, the control circuit 650 operates the switching power converter circuit 645 as a buck converter circuit.

During the boost mode, the control circuit 650 may charge the inductor 620 from the first energy source at the input port 630 using modulation of the first switch circuit S1 and the fourth switch circuit S4 during a charge phase, and provide the energy from the inductor 620 to the variable load and the second energy source during a discharge phase using the second switch circuit S2 and the third switch circuit S3.

During the buck mode, the control circuit 650 may charge the inductor 620 from the second energy source at the input/output port 640 using modulation of the second switch circuit S2 and fifth switch circuit S5 during a charge phase. During a discharge phase of the buck mode, the control circuit 650 provides the energy from the inductor 620 to the variable load at the output port 635 using the second switch circuit S2 and sixth switch circuit S6, and provides energy from the second energy source to the variable load at the output port 635 using the third switch circuit S3.

The several examples of systems, devices, and method described can be used to harvest energy from any source and a storage device such as a battery or supercapacitor can be used to absorb the extra energy that isn't consumed by the load. Priority of energy delivery is given to the load instead of the energy storage device. The energy storage device provides additional power to the load when the energy harvest source is not able to keep with demand such as at times of peak demand by the load. The examples with more switches improve the efficiency by providing a buck mode when energy is transferred from the energy storage device to the load. Allowing bidirectional current in the inductor allows some switches to be shared between modes.

ADDITIONAL NOTES

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An energy supply circuit comprising:
    a switching power converter circuit, including:
        an output port configured for electrical coupling to a variable load;
        an input port configured for electrically coupling to a first energy source having an energy density insufficient to meet a peak energy requirement of the variable load;
        an input/output port for electrical coupling to a second energy source; and
        an inductor electrically coupled to the input port and a circuit node, wherein the electrical coupling is non-switchable; and
    a control circuit configured to charge the inductor using the first energy source via the input port, to provide energy from the inductor to the load via the output port, and to provide both of, via the input/output port, energy from the inductor to the second energy source and energy from the second energy source to the variable load.

2. The energy supply circuit of claim 1, wherein the switching power converter circuit includes:
    a first switch circuit electrically coupled between the circuit node and a common voltage plane;
    a second switch circuit electrically coupled between the circuit node and the output port; and
    a third switch circuit electrically coupled between the circuit node and the input/output port, and
    wherein the control circuit is configured to charge the inductor from the first energy source using modulation of the first switch circuit, to provide the energy from the inductor to the load using modulation of the second switch circuit, and to provide both of, using the third switch circuit, the energy from the inductor to the second energy source and the energy from the second energy source to the variable load.

3. The energy supply circuit of claim 2, wherein the control circuit is configured to operate the switching power converter circuit as a buck-boost topology having a plurality of phases including a boost charge phase, and a buck charge phase, and the wherein inductor is charged using the first energy source during the boost charge phase and charged using the second energy source during the buck charge phase.

4. The energy supply circuit of claim 2, wherein the control circuit is configured to operate the switching power converter circuit as a boost converter, and wherein the switching power converter circuit includes a low drop out (LDO) regulator electrically coupled between the input/output port and the output port, and wherein the LDO is configured to provide energy at a regulated voltage from the second energy source at the input/output port to the load at the output port.

5. The energy supply circuit of claim 2, wherein the control circuit is configured to operate the switching power converter circuit as a boost converter, wherein the switching power converter circuit includes a fourth switch circuit electrically coupled between the input/output port and the output port, and wherein the control circuit is configured to operate the fourth switch circuit to provide energy from the second energy source at the input/output port to the load at the output port.

6. The apparatus of claim 1, including the first energy source, wherein first energy source includes at least one of a photovoltaic cell circuit and a thermoelectric generator circuit.

7. The energy supply circuit of claim 1, including the second energy source, wherein second energy source includes at least one of a rechargeable battery and a supercapacitor.

8. The energy supply circuit of claim 1, including a wireless transceiver electrically coupled to the output port and configured to operate in an active mode and a standby mode, wherein the control circuit is configured to provide energy from the inductor to the wireless transceiver and the input/output port when the wireless transceiver is in the standby mode, and provide energy from the input/output port to the when the wireless transceiver is in the active mode.

9. The energy supply circuit of claim 8, including a wireless sensor electrically coupled to the wireless transceiver.

10. An energy harvest system comprising:
    a first energy source;
    a second energy source, wherein the second energy source is rechargeable;
    a switching power converter circuit, including:
        an output port electrically coupled to a variable load;
        an input port electrically coupled to a first energy source having an energy density insufficient to meet a peak energy requirement of the variable load;
        an input/output port electrically coupled to the second energy source; and
        an inductor electrically coupled to the input port and a first circuit node; and
    a control circuit configured to:
        charge the inductor using the first energy source;
        provide energy from the inductor to the variable load via the output port and to provide energy from the inductor to the second energy source via the input/output port when the energy used by the variable load is less than the energy provided by the first energy source; and
        provide energy from the second energy source to the variable load via the input/output port when the energy used by the variable load is greater than the energy provided by the first energy source.

11. The system of claim 10, wherein the control circuit is configured to operate the switching power converter circuit as a buck-boost topology having a plurality of phases including a boost charge phase, and a buck charge phase, wherein the electrical coupling of the one inductor to the input port and the first circuit node is non-switchable, and the wherein inductor is charged using the first energy source during the boost charge phase and charged using the second energy source during the buck charge phase.

12. The system of claim 10, wherein the control circuit is configured to operate the switching power converter circuit as a boost converter, wherein the electrical coupling of the one inductor to the input port and the first circuit node is non-switchable, and wherein the switching power converter circuit includes a low drop out (LDO) regulator electrically coupled between the input/output port and the output port, and wherein the LDO is configured to provide energy at a regulated voltage from the second energy source to the variable load.

13. The system of claim 10, wherein the control circuit is configured to operate the switching power converter circuit as a boost converter, wherein the electrical coupling of the one inductor to the input port and the first circuit node is non-switchable, wherein the switching power converter circuit includes a fourth switch circuit electrically coupled between the input/output port and the output port, and wherein the control circuit is configured to operate the fourth switch circuit to provide energy from the second energy source at the input/output port to the variable load when the variable load uses more energy than the energy provided by the first energy source.

14. The system of claim 10, wherein the switching power converter circuit includes:
    a first switch circuit electrically coupled between the first circuit node and a common voltage plane;
    a second switch circuit electrically coupled between the first circuit node and the output port; and
    a third switch circuit electrically coupled between the first circuit node and the input/output port,
    wherein the control circuit is configured to, when the variable load uses less energy than the energy provided by the first energy source, charge the inductor from the first energy source using modulation of the first switch circuit and provide the energy from the inductor to the load using modulation of the second switch circuit, and when the variable load uses more energy than the energy provided by the first energy source, provide energy from the second energy source to the load using modulation of the third switch circuit.

15. The system of claim 14, wherein the switching power converter circuit includes a fourth switch circuit electrically coupled between the first energy source and a second circuit node, a fifth switch electrically coupled between the second energy source and the second circuit node, and a sixth switch circuit electrically coupled between second circuit node and the common voltage plane, wherein the inductor is electrically coupled between the second circuit node and the first circuit node, and wherein the control circuit is configured to operate the switching power converter circuit as a buck-boost topology.

16. The system of claim 15, wherein the control circuit is configured to:
    charge the inductor from the first energy source using modulation of the first switch circuit and the fourth switch circuit;
    charge the inductor from the second energy source using modulation of the second switch circuit and fifth switch circuit; and
    provide energy from the inductor to the output port using the second switch circuit and sixth switch circuit and provide energy from the second energy source to the output port using the third switch circuit when the variable load uses more energy than the energy provided by the first energy source.

17. The system of claim 10, including a wireless transceiver having a standby mode and an active mode, and electrically coupled to the output port of the switching power converter circuit; wherein the switching power converter circuit is configured to provide energy from the inductor to the load via the output port and to provide energy from the inductor to the second energy source via the input/output port when the wireless transceiver is in a standby mode, and provide energy from the second energy source to the wireless transceiver when the wireless transceiver is in an active mode.

18. A method of operating an energy harvest system, the method comprising:
    receiving energy from a first energy source at an input port of a switching power converter circuit having an inductor;
    providing energy from the one inductor at a regulated voltage to an output port of the switching power converter circuit when the received energy from the first energy source is greater than the energy used at the output port, wherein a variable load is electrically coupled to the output port and wherein an energy density of the first energy source is insufficient to meet a peak energy requirement of the variable load;

providing excess energy received from the first energy source and unused at the output port to a second energy source at an input/output port of the switching power converter circuit; and providing energy to the output port of the switching power converter circuit from the input/output port of the switching power converter circuit when the received energy from the first energy source is less than the energy used at the output port.

19. The method of claim 18, wherein receiving energy from a first energy source includes bidirectional charging of the one inductor of the switching power converter using the first energy source and the second energy source.

20. The method of claim 18, wherein the providing energy at a regulated voltage includes providing the energy at a regulated voltage by operating the switching power converter circuit in a boost mode.

\* \* \* \* \*